Aug. 27, 1963  R. TOSI  3,101,602
PROCESS FOR FORMING THE FOLDED-BACK BORDER OF
PIECES WORKED OF A HIDE OR SKIN AND THE LIKE
Filed March 29, 1961  2 Sheets-Sheet 1

INVENTOR.
ROBERTO TOSI
BY Richards & Geier
ATTORNEYS

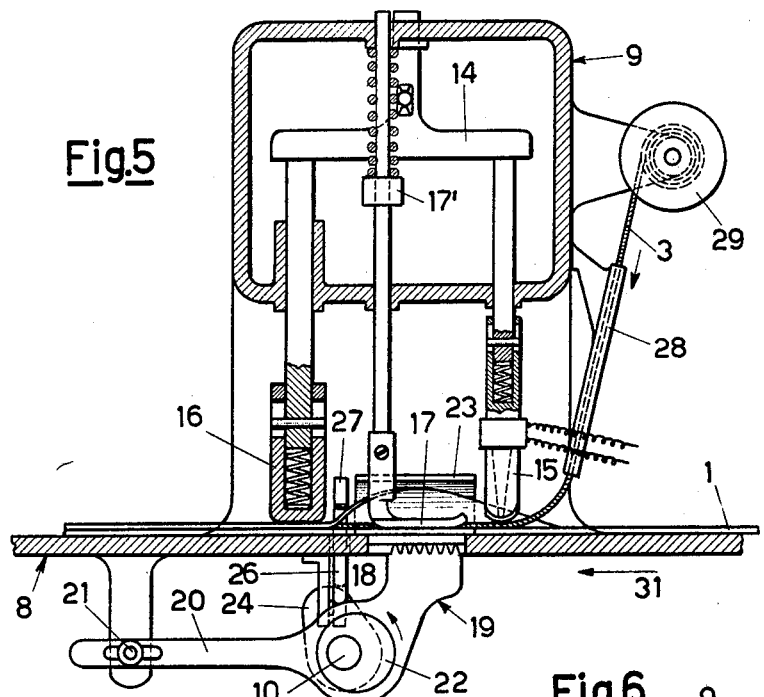
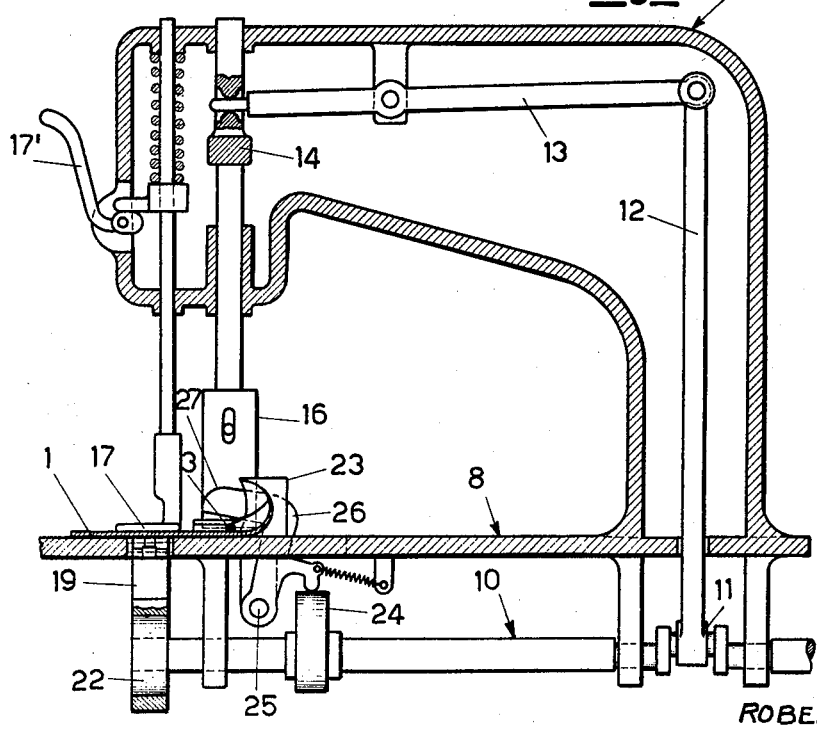

3,101,602
PROCESS FOR FORMING THE FOLDED-BACK BORDER OF PIECES WORKED OF A HIDE OR SKIN AND THE LIKE

Roberto Tosi, Via Guerrazzi 5, Busto Arsizio, Italy
Filed Mar. 29, 1961, Ser. No. 99,092
Claims priority, application Italy Apr. 2, 1960
2 Claims. (Cl. 69—21)

The present invention concerns a process for obtaining a folded-back border on pieces of leather such as, for example, the pieces destined to form the uppers of footwear.

According to known technique, these borders are obtained by feeding at the border, being preferably chamfered, a thermoplastic adhesive material in at least partly fused state and folding back the border in such a way as to enclose the thermoplastic material, which so comes to constitute the glue. This thermoplastic material is fed onto the piece, which is fed forward during the folding operation, by means of a nozzle, to which the material arrives in already fused shape, or sufficiently plasticized, or in the shape of a pre-fabricated tape or thread, in which case the nozzle has a temperature sufficient to melt or soften the material.

According to the present invention, the thermoplastic material is placed on the material constituting the border in cold and solid state, and is then heated up till it melts or softens sufficiently, while it is at contact with the leather piece or other material constituting the border, immediately prior to folding back said border.

In that way, the thermoplastic material can be prepared previously and the machine for forming the border does not involve any tanks or dies or nozzles to be heated and no part of the thermoplastic material is wasted; moreover it is not necessary to provide any means for feeding forward the thermoplastic material in the shape of a thread, since it is pulled by the very bordered piece that is being forwarded.

It is necessary however, for that purpose, that the said thread should have a tensile strength sufficient not to break and that it should keep same also in the molten or softened state of the plastic material. Hence according to the invention the thread comprises a thread-like core of material that cannot become deteriorated at the temperature of treatment, which core provides the desired tensile strength.

It is suitable that this resistant core should have quite small a thickness in order not to disturb by its presence the formation of the border, nor to cause any desirable thickening and stiffening in the border formed, though constituting a useful reinforcement of said border.

Moreover it has been found that if adopting as a core a bundle of loose substantially parallel fibres such as those for instance of a wick substantially free from torsion or provided with scarce torsion, and impregnating that bundle or wick in hot condition with thermoplastic material, one obtains a thread which is excellently suited for the purpose specified above, as will be explained more in detail hereinafter, because the cross-section of such thread can undergo in any way deformation and flattening in hot condition and the thermoplastic material can be brought locally to melting without diminishing for that reason to any appreciable extent the tensile strength of the continuous thread.

The process according to the invention will be now more fully described by way of example without limitation, with reference to the accompanying drawings, which also illustrate, again by way of example, diagrammatically a machine for the carrying out of the process.

In the drawings:

FIG. 5 and FIG. 6 represent diagrammatically a machine for carrying out the process of the present invention, the machine being illustrated in elevational view respectively in two vertical sections, orthogonal to each other.

Figure 1:
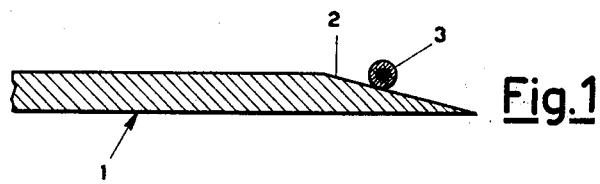
FIGS. 1, 2 and 3 show the successive stages of working for obtaining according to the invention the folding-back on a piece leather as seen in cross-section.
Figure 2:
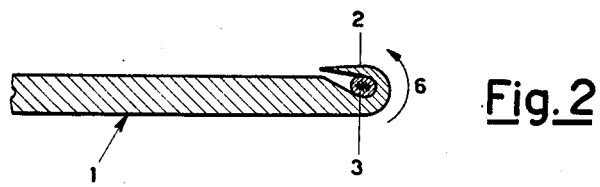
Figure 3:
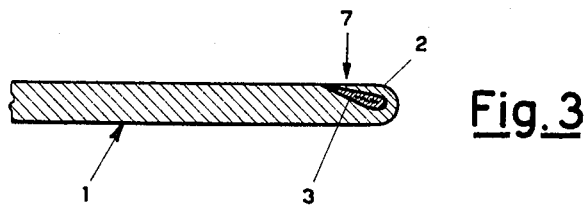
Figure 4:
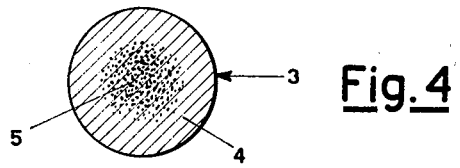
FIG. 4 illustrates, on enlarged scale, the cross-section of the composite thread according to the invention.

With reference firstly to the cited FIGURES 1, 2 and 3, to obtain the finished folded-back part shown in FIG. 3, a portion of a leather piece 1, with a border chamfered peripherally at 2, receives (see FIGURE 1) on said chamfer 2 a composite thread 3, formed according to the invention by a plastic material 4 such as for instance polyvinyl acetate, with which there is incorporated a plurality of fibres 5 of a flexible material, resistant to compression and to heat, preferably glass fibres.

Subsequently (see FIG. 2) the chamfered border 2 is folded back according to the arrow 6 on the thread 3, which was previously heated up to softening the plastic material 4. Then (see FIG. 3) the chamfered border 2 is flattened by compression, according to the arrow 7, whereby the thread 3 too is flattened by deformation. The deformation and flattening of the thread are easily possible because said thread has been provided being formed from fibres 5 not wound about one another and not twisted, but only put side by side and substantially parallel to one another or twisted to reduced extent. In that way the thread 3 can undergo deformation by the action of compression, its fibres placing themselves into the flattened space constituted by the border 2 without creating substantially any major thickness while the plastic material 4, made fluid by heating, goes and fills all of the interstices, acting as a glue, without any possibility of becoming squeezed out from the folded-back portion, being withheld by the thin fibres incorporated therewith.

To effect the various stages of heating of the thread, its application to the piece of leather, the forwarding of the latter, the curving of the chamfered border and the compression and flattening of the folded-back portion, the machine diagrammatically represented in FIGURES 5 and 6 is utilized.

Said machine comprises a fixed plate 8, with which there is rigid a hollow upper arm 9.

Under the plate there is mounted the control shaft 10 which by means of a goose-neck 11 and connecting shafts 12, 13, controls by vertical reciprocating motion, the traverse 14 whereon is mounted, with the possibility of axial springing, a heating element 15 and a presser 16.

On the upper arm 9 is also mounted the small springed foot 17 (to be lifted immediately by hand control 17') which is adapted to press onto the piece of hide or skin 1, at a window 18 provided in the plate 8 and from which can slightly project upwards a grip 19 carried by an oscillating arm 20, mounted, with the possibility of slight axial sliding on the fulcrum 21 rigid with the plate 8.

The grip 19 is controlled to project periodically from the window 18 by an eccentric 22 fitted onto the shaft 10.

On the plate 8 there is mounted at the side of the window 18, the fixed piece 23, which serves to fold upwards, as it is being forwarded, the chamfered border 2 of the piece 1.

On the same shaft 10 there is also fitted a cam 24 adapted to oscillate around the fulcrum 25 and periodically, the springed member 26, whose upper extension 27 completes the tilting of the border 2 has commenced by the fixed piece 23.

The machine also involves a thread-guide 28, through which the composite thread 3 according to the invention passes, coming from a bobbin 29, in the direction of the arrow 30.

From the description given above, the operation of the machine evidently may be summarized as follows:

The piece 1 is forwarded in the direction of the arrow 31 intermittently by the cooperation of the member 19 with the member 17 and at the same time the thread 3 is dragged. While this forwarding is taking place, the members 15, 16, 27 are lifted; when the forwarding is momentarily stopped, the members just cited are lowered. The member 15 provides heating of the thread 3, rendering the plastic material 4 somewhat fluid. The member 27 completes the tilting of the border 2 around the thread 3 already commenced by the member 23. The member 16 effects the compression and so the condition represented in FIG. 3 is attained.

Subsequently, the members 15, 16 and 27 rise again and the intermittent forwarding recommences and so on.

As will be seen the core 5 is inserted in the border to constitute the armature thereof with the same operation with which the feeding of the glue is effected, to the contrary of what was done heretofore with a special introduction separately carried out, of a reinforcing thread.

Though only one form of embodiment has been described and illustrated of a machine in order to explain the possibility of effecting the process of the invention, other ones may be contrived or also already known machines may be adopted for the new process, without departing from the scope of the present invention.

I claim:

1. A method of forming a reinforced marginal border on a leather piece and the like which comprises beveling one side of a leather piece for a distance inwardly of its marginal edge, placing a reinforcing thread composed of a core of flexible inorganic fibers and a plastic shell encasing said fibers on the beveled surface, heating the thread to render said plastic shell thermoplastic, folding over the beveled portion of the leather strip whereby it constitutes an enclosure having inner surfaces enclosing said reinforcing thread, and applying pressure to the folded-over beveled portion to deform the thermoplastic shell and cause it to adhere to the inner surfaces of said enclosure.

2. A method in accordance with claim 1 wherein the core of said reinforcing thread is glass fibers and the plastic shell is vinyl-acetate.

References Cited in the file of this patent
UNITED STATES PATENTS

| | | |
|---|---|---|
| 2,313,058 | Francis | Mar. 9, 1943 |
| 2,657,161 | Luitwieler | Oct. 27, 1953 |

FOREIGN PATENTS

| | | |
|---|---|---|
| 683,211 | France | Feb. 5, 1930 |